United States Patent
Heismann et al.

(10) Patent No.: US 8,131,157 B2
(45) Date of Patent: Mar. 6, 2012

(54) METHOD AND APPARATUS FOR GENERATING SIGNALS WITH INCREASED DISPERSION TOLERANCE USING A DIRECTLY MODULATED LASER TRANSMITTER

(75) Inventors: Fred L. Heismann, Colts Neck, NJ (US); Daniel Mahgerefteh, Palo Alto, CA (US); Parviz Tayebati, Boston, MA (US)

(73) Assignee: Finisar Corporation, Sunnyvale, CA (US)

( * ) Notice: Subject to any disclaimer, the term of this patent is extended or adjusted under 35 U.S.C. 154(b) by 958 days.

(21) Appl. No.: 12/017,957

(22) Filed: Jan. 22, 2008

(65) Prior Publication Data

US 2008/0181619 A1    Jul. 31, 2008

Related U.S. Application Data

(60) Provisional application No. 60/881,637, filed on Jan. 22, 2007.

(51) Int. Cl.
*H04B 10/04* (2006.01)

(52) U.S. Cl. ........ 398/192; 398/193; 398/194; 398/195; 398/199

(58) Field of Classification Search .......... 398/190–194, 398/199, 186, 201, 185, 187, 157, 81, 118, 398/147
See application file for complete search history.

(56) References Cited

U.S. PATENT DOCUMENTS

| | | |
|---|---|---|
| 3,324,295 A | 6/1967 | Harris |
| 3,973,216 A | 8/1976 | Hughes et al. |
| 3,999,105 A | 12/1976 | Archey et al. |
| 4,038,600 A | 7/1977 | Thomas et al. |
| 4,561,119 A | 12/1985 | Epworth |
| 4,671,604 A | 6/1987 | Soref |
| 4,754,459 A | 6/1988 | Westbrook |
| 4,805,235 A | 2/1989 | Henmi |
| 4,841,519 A | 6/1989 | Nishio |
| 4,896,325 A | 1/1990 | Coldren |
| 4,908,833 A | 3/1990 | Chraplyvy et al. |
| 4,914,667 A | 4/1990 | Blonder et al. |
| 5,088,097 A | 2/1992 | Ono et al. |
| 5,119,393 A | 6/1992 | Oka et al. |
| 5,136,598 A | 8/1992 | Weller et al. |

(Continued)

FOREIGN PATENT DOCUMENTS

CA    2510352    3/2010

(Continued)

OTHER PUBLICATIONS

Matsui et al., Chirp-Managed Directly Modulated Laser (CML), IEEE, Photonics Technology Letters, vol. 18, No. 2, Jan. 15, 2006.*

(Continued)

*Primary Examiner* — Kenneth N Vanderpuye
*Assistant Examiner* — Abbas H Alagheband
(74) *Attorney, Agent, or Firm* — Maschoff Gilmore & Israelsen (57) ABSTRACT

An optical transmitter is disclosed wherein a modulating signal, such as an NRZ signal, encoding data is combined with a time derivative of the modulating signal and coupled to a directly modulated laser in order to generate artificial transient chirp in the output of the laser effective to substantially compensate for dispersion experienced by the output of the laser traveling through a dispersive medium such as an optical fiber. In some embodiments, the time derivative is added to the modulating signal only at the falling edges of the modulating signal.

21 Claims, 8 Drawing Sheets

U.S. PATENT DOCUMENTS

| | | | |
|---|---|---|---|
| 5,170,402 A | 12/1992 | Ogita et al. | |
| 5,177,630 A | 1/1993 | Goutzoulis et al. | |
| 5,293,545 A | 3/1994 | Huber | |
| 5,325,378 A | 6/1994 | Zorabedian | |
| 5,325,382 A | 6/1994 | Emura et al. | |
| 5,371,625 A | 12/1994 | Wedding et al. | |
| 5,394,429 A | 2/1995 | Yamada et al. | |
| 5,412,474 A | 5/1995 | Reasenberg et al. | |
| 5,416,629 A | 5/1995 | Huber | |
| 5,434,693 A | 7/1995 | Tanaka et al. | |
| 5,450,432 A | 9/1995 | Okuda | |
| 5,459,799 A | 10/1995 | Weber | |
| 5,465,264 A | 11/1995 | Buhler et al. | |
| 5,477,368 A | 12/1995 | Eskildsen et al. | |
| 5,550,667 A | 8/1996 | Krimmel et al. | |
| 5,568,311 A | 10/1996 | Matsumoto | |
| 5,592,327 A | 1/1997 | Gabl et al. | |
| 5,642,371 A | 6/1997 | Tohyama et al. | |
| 5,696,859 A | 12/1997 | Onaka et al. | |
| 5,737,104 A | 4/1998 | Lee et al. | |
| 5,777,773 A | 7/1998 | Epworth et al. | |
| 5,805,235 A | 9/1998 | Bedard | |
| 5,856,980 A | 1/1999 | Doyle et al. | |
| 5,920,416 A | 7/1999 | Beylat et al. | |
| 5,946,129 A | 8/1999 | Xu et al. | |
| 5,953,139 A | 9/1999 | Nemecek et al. | |
| 5,953,361 A | 9/1999 | Borchert | |
| 5,974,209 A | 10/1999 | Cho et al. | |
| 5,991,323 A | 11/1999 | Adams et al. | |
| 6,018,275 A | 1/2000 | Perrett et al. | |
| 6,081,361 A | 6/2000 | Adams et al. | |
| 6,088,373 A | 7/2000 | Hakki | |
| 6,091,743 A | 7/2000 | Yang | |
| 6,096,496 A | 8/2000 | Frankel | |
| 6,104,851 A | 8/2000 | Mahgerefteh | |
| 6,115,403 A | 9/2000 | Brenner et al. | |
| 6,148,017 A | 11/2000 | Borchert et al. | |
| 6,157,025 A | 12/2000 | Katagiri et al. | |
| 6,188,499 B1 | 2/2001 | Majima | |
| 6,222,861 B1 | 4/2001 | Kuo et al. | |
| 6,271,959 B1 | 8/2001 | Kim et al. | |
| 6,282,003 B1* | 8/2001 | Logan et al. ........... 398/185 |
| 6,298,186 B1 | 10/2001 | He | |
| 6,331,991 B1 | 12/2001 | Mahgerefteh | |
| 6,351,585 B1 | 2/2002 | Amundson et al. | |
| 6,353,623 B1 | 3/2002 | Munks et al. | |
| 6,359,716 B1 | 3/2002 | Taylor | |
| 6,421,151 B1 | 7/2002 | Berger | |
| 6,459,518 B1 | 10/2002 | Suzuki et al. | |
| 6,473,214 B1 | 10/2002 | Roberts et al. | |
| 6,486,440 B1 | 11/2002 | Crafts et al. | |
| 6,506,342 B1 | 1/2003 | Frankel | |
| 6,522,809 B1 | 2/2003 | Takabayashi et al. | |
| 6,563,623 B1 | 5/2003 | Penninckx et al. | |
| 6,577,013 B1 | 6/2003 | Glenn et al. | |
| 6,580,739 B1 | 6/2003 | Coldren | |
| 6,618,513 B2 | 9/2003 | Evankow, Jr. | |
| 6,628,690 B1 | 9/2003 | Fish et al. | |
| 6,650,667 B2 | 11/2003 | Nasu et al. | |
| 6,654,564 B1 | 11/2003 | Colbourne et al. | |
| 6,658,031 B2 | 12/2003 | Tuganov et al. | |
| 6,665,351 B2 | 12/2003 | Hedberg et al. | |
| 6,687,278 B1 | 2/2004 | Mason et al. | |
| 6,690,686 B2 | 2/2004 | Delfyett | |
| 6,738,398 B2 | 5/2004 | Hirata | |
| 6,748,133 B2 | 6/2004 | Liu et al. | |
| 6,778,307 B2 | 8/2004 | Clark | |
| 6,785,308 B2 | 8/2004 | Dyer et al. | |
| 6,807,215 B2 | 10/2004 | Lam et al. | |
| 6,810,047 B2 | 10/2004 | Oh et al. | |
| 6,815,786 B2 | 11/2004 | Ogasawara et al. | |
| 6,834,134 B2 | 12/2004 | Brennan et al. | |
| 6,836,487 B1 | 12/2004 | Farmer et al. | |
| 6,847,758 B1 | 1/2005 | Watanabe | |
| 6,943,951 B2 | 9/2005 | Kikuchi et al. | |
| 6,947,206 B2 | 9/2005 | Tsadka et al. | |
| 6,963,685 B2 | 11/2005 | Mahgerefteh et al. | |
| 7,013,090 B2 | 3/2006 | Adachi et al. | |
| 7,027,470 B2 | 4/2006 | May | |
| 7,054,538 B2 | 5/2006 | Mahgerefteh et al. | |
| 7,073,956 B1 | 7/2006 | Shin et al. | |
| 7,076,170 B2 | 7/2006 | Choa | |
| 7,123,846 B2 | 10/2006 | Tateyama et al. | |
| 7,164,865 B2 | 1/2007 | Tatsuno et al. | |
| 7,187,821 B2 | 3/2007 | Matsui et al. | |
| 7,263,291 B2 | 8/2007 | Mahgerefteh et al. | |
| 7,280,721 B2 | 10/2007 | McCallion et al. | |
| 7,352,968 B2 | 4/2008 | Tayebati et al. | |
| 7,356,264 B2 | 4/2008 | Mahgerefteh et al. | |
| 7,376,352 B2 | 5/2008 | Tayebati | |
| 7,406,266 B2 | 7/2008 | Mahgerefteh et al. | |
| 7,406,267 B2 | 7/2008 | Mahgerefteh et al. | |
| 7,433,605 B2 | 10/2008 | Mahgerefteh et al. | |
| 7,474,858 B2 | 1/2009 | Lee et al. | |
| 7,474,859 B2 | 1/2009 | Mahgerefteh et al. | |
| 7,477,851 B2 | 1/2009 | Mahgerefteh et al. | |
| 7,480,464 B2 | 1/2009 | McCallion et al. | |
| 7,492,976 B2 | 2/2009 | Mahgerefteh et al. | |
| 7,502,532 B2 | 3/2009 | McCallion et al. | |
| 7,505,694 B2 | 3/2009 | Johnson et al. | |
| 7,515,626 B2 | 4/2009 | Lee et al. | |
| 7,536,113 B2 | 5/2009 | Matsui et al. | |
| 7,542,683 B2 | 6/2009 | Matsui et al. | |
| 7,555,225 B2 | 6/2009 | Mahgerefteh et al. | |
| 7,558,488 B2 | 7/2009 | Matsui et al. | |
| 7,564,889 B2 | 7/2009 | Matsui et al. | |
| 7,609,977 B2 | 10/2009 | Matsui et al. | |
| 7,613,401 B2 | 11/2009 | Matsui et al. | |
| 7,616,902 B2 | 11/2009 | Mahgerefteh et al. | |
| 7,630,425 B2 | 12/2009 | Tayebati et al. | |
| 7,639,955 B2 | 12/2009 | Zheng et al. | |
| 7,657,179 B2 | 2/2010 | Mahgerefteh et al. | |
| 7,663,762 B2 | 2/2010 | Mahgerefteh et al. | |
| 7,697,186 B2 | 4/2010 | McCallion et al. | |
| 7,697,847 B2 | 4/2010 | Matsui et al. | |
| 7,742,542 B2 | 6/2010 | Mahgerefteh et al. | |
| 7,760,777 B2 | 7/2010 | Matsui et al. | |
| 7,778,295 B2 | 8/2010 | Matsui et al. | |
| 7,809,280 B2 | 10/2010 | Mahgerefteh et al. | |
| 7,860,404 B2 | 12/2010 | Matsui et al. | |
| 2001/0012430 A1 | 8/2001 | Usami et al. | |
| 2001/0048705 A1 | 12/2001 | Kitaoka et al. | |
| 2002/0012369 A1 | 1/2002 | Nasu et al. | |
| 2002/0044738 A1 | 4/2002 | Jablonski | |
| 2002/0048290 A1 | 4/2002 | Tanaka et al. | |
| 2002/0063930 A1 | 5/2002 | Blauvelt | |
| 2002/0094000 A1* | 7/2002 | Heilman et al. ........... 372/38.02 |
| 2002/0131047 A1 | 9/2002 | Zarrabian et al. | |
| 2002/0154372 A1 | 10/2002 | Chung et al. | |
| 2002/0159490 A1 | 10/2002 | Karwacki | |
| 2002/0176659 A1 | 11/2002 | Lei et al. | |
| 2003/0002099 A1 | 1/2003 | Sayyah et al. | |
| 2003/0002120 A1 | 1/2003 | Choa | |
| 2003/0025624 A1* | 2/2003 | Roza ........................ 341/143 |
| 2003/0063647 A1 | 4/2003 | Yoshida et al. | |
| 2003/0067952 A1 | 4/2003 | Tsukiji et al. | |
| 2003/0077031 A1 | 4/2003 | Zhang et al. | |
| 2003/0099018 A1 | 5/2003 | Singh et al. | |
| 2003/0147114 A1 | 8/2003 | Kang et al. | |
| 2003/0161370 A1 | 8/2003 | Buimovich et al. | |
| 2003/0169787 A1 | 9/2003 | Vergaftman et al. | |
| 2003/0193974 A1 | 10/2003 | Frankel et al. | |
| 2003/0210912 A1 | 11/2003 | Leuthold | |
| 2004/0008933 A1 | 1/2004 | Mahgerefteh et al. | |
| 2004/0008937 A1 | 1/2004 | Mahgerefteh et al. | |
| 2004/0036943 A1 | 2/2004 | Freund et al. | |
| 2004/0076199 A1 | 4/2004 | Wipiejewski et al. | |
| 2004/0081386 A1 | 4/2004 | Morse et al. | |
| 2004/0086012 A1 | 5/2004 | Kitaoka et al. | |
| 2004/0096221 A1 | 5/2004 | Mahgerefteh et al. | |
| 2004/0218890 A1 | 11/2004 | Mahgerefteh et al. | |
| 2004/0234200 A1 | 11/2004 | Jennings et al. | |
| 2005/0100345 A1 | 5/2005 | Welch et al. | |
| 2005/0111852 A1 | 5/2005 | Mahgerefteh et al. | |
| 2005/0152702 A1 | 7/2005 | Mahgerefteh et al. | |
| 2005/0163512 A1 | 7/2005 | Tayebati et al. | |
| 2005/0169638 A1 | 8/2005 | Tayebati et al. | |

| | | | |
|---|---|---|---|
| 2005/0169642 A1 | 8/2005 | Mahgerefteh et al. |
| 2005/0175356 A1 | 8/2005 | McCallion et al. |
| 2005/0196177 A1 | 9/2005 | Moran |
| 2005/0206989 A1 | 9/2005 | Marsh |
| 2005/0213993 A1 | 9/2005 | Kazemi-Nia et al. |
| 2005/0249509 A1 | 11/2005 | Nagarajan et al. |
| 2005/0271394 A1 | 12/2005 | Whiteaway et al. |
| 2005/0286829 A1 | 12/2005 | Mahgerefteh et al. |
| 2005/0286909 A1 | 12/2005 | Kish et al. |
| 2006/0002718 A1 | 1/2006 | Matsui et al. |
| 2006/0008272 A1 | 1/2006 | Abeles et al. |
| 2006/0018666 A1 | 1/2006 | Matsui et al. |
| 2006/0029358 A1 | 2/2006 | Mahgerefteh et al. |
| 2006/0029396 A1 | 2/2006 | Mahgerefteh et al. |
| 2006/0029397 A1 | 2/2006 | Mahgerefteh et al. |
| 2006/0078338 A1 | 4/2006 | Johnson et al. |
| 2006/0120416 A1 | 6/2006 | Hu et al. |
| 2006/0193636 A1 | 8/2006 | Katagiri et al. |
| 2006/0228120 A9 | 10/2006 | McCallion et al. |
| 2006/0233556 A1 | 10/2006 | Mahgerefteh et al. |
| 2006/0239306 A1 | 10/2006 | Donohoe |
| 2006/0274993 A1 | 12/2006 | Mahgerefteh et al. |
| 2007/0286608 A1 | 12/2007 | Matsui et al. |
| 2008/0002990 A1 | 1/2008 | McCallion et al. |
| 2008/0037608 A1 | 2/2008 | Zhou et al. |
| 2008/0159747 A1 | 7/2008 | Mahgerefteh et al. |
| 2008/0181619 A1 | 7/2008 | Heismann |
| 2008/0187325 A1 | 8/2008 | McCallion et al. |
| 2008/0193132 A1 | 8/2008 | Matsui et al. |
| 2008/0193144 A1 | 8/2008 | Zhou et al. |
| 2008/0240180 A1 | 10/2008 | Matsui et al. |
| 2008/0247763 A1 | 10/2008 | Mahgerefteh et al. |
| 2008/0247765 A1 | 10/2008 | Mahgerefteh et al. |
| 2008/0291950 A1 | 11/2008 | McCallion et al. |
| 2009/0003842 A1 | 1/2009 | Mahgerefteh et al. |
| 2009/0060526 A1 | 3/2009 | Matsui et al. |
| 2009/0080905 A1 | 3/2009 | Olsson |
| 2009/0196631 A1 | 8/2009 | Daghighian et al. |
| 2009/0238224 A1 | 9/2009 | Ye |
| 2009/0269069 A1 | 10/2009 | Mahgerefteh et al. |
| 2010/0008679 A1 | 1/2010 | Cole |
| 2010/0098436 A1 | 4/2010 | Mahgerefteh et al. |
| 2010/0279447 A1 | 11/2010 | Matsui et al. |
| 2010/0311195 A1 | 12/2010 | Matsui et al. |

FOREIGN PATENT DOCUMENTS

| | | |
|---|---|---|
| CN | 1236891 | 12/1999 |
| CN | 200380108289.9 | 11/2007 |
| CN | 200380108289.9 | 8/2008 |
| CN | 200380108289.9 | 11/2008 |
| CN | 200580015245.0 | 9/2009 |
| CN | 200580012705.4 | 3/2010 |
| CN | 200580015245.0 | 3/2010 |
| CN | 200580037807 | 5/2010 |
| CN | 200880009551.7 | 7/2010 |
| EP | 052758 A2 * | 7/1992 |
| EP | 0524758 | 7/1992 |
| EP | 524758 A2 * | 1/1993 |
| EP | 602659 | 6/1994 |
| EP | 05731268.8 | 1/2008 |
| EP | 05764209.2 | 6/2009 |
| EP | 05731268.8 | 5/2010 |
| GB | 2 107 147 | 4/1983 |
| JP | 58-075340 | 5/1983 |
| JP | 62-189832 | 8/1987 |
| JP | 09-214427 | 8/1997 |
| JP | 11-031859 | 2/1999 |
| JP | 2000105313 | 4/2000 |
| JP | 2001-036477 | 2/2001 |
| JP | 2001-284711 | 10/2001 |
| JP | 2001291928 | 10/2001 |
| JP | 2001320328 | 11/2001 |
| JP | 2002243935 | 8/2002 |
| JP | 2002267834 | 9/2002 |
| JP | 2002267998 | 9/2002 |
| JP | 2002-311235 | 10/2002 |
| JP | 2004-551835 | 7/2008 |
| JP | 2004-551835 | 3/2010 |
| JP | 2009-504345 | 4/2010 |
| JP | 2009-504345 | 10/2010 |
| KR | 102008-7027139 | 4/2010 |
| WO | 9905804 | 2/1999 |
| WO | 0104999 | 1/2001 |
| WO | WO 0117076 | 3/2001 |
| WO | WO 0118919 | 3/2001 |
| WO | 03005512 | 7/2002 |

OTHER PUBLICATIONS

Chirp-Managed Directly Modulated Laser (CML), Yasuhiro Matsui, Daniel Mahgerefteh, IEEE, Xueyan Zheng, Charlie Liano, Zhencan Frank Fan, Kevin McCallin and Parviz Tayebati. IEEE Photonic Technology Lettes, vol. 18 No. 2, Jan. 15, 2006.*
Freund et al, 30 Gbit/s RZ 8-PSK Transmission over 2800 km Standard Single Mode Fibre without Inline Dispersion Compensation, 2007, 3 pages.
U.S. Appl. No. 11/964,315, Mail Date Aug. 25, 2010, Office Action.
U.S. Appl. No. 11/964,315, Mail Date Feb. 4, 2011, Notice of Allowance.
U.S. Appl. No. 11/964,321, Mail Date Aug. 25, 2010, Office Action.
U.S. Appl. No. 11/964,321, Mail Date Dec. 29, 2010, Notice of Allowance.
U.S. Appl. No. 12/014,676, Mail Date Mar. 18, 2011, Notice of Allowance.
U.S. Appl. No. 12/028,675, Mail Date Mar. 24, 2011, Notice of Allowance.
U.S. Appl. No. 12/028,678, Mail Date May 16, 2011, Notice of Allowance.
U.S. Appl. No. 12/047,017, Mail Date Jun. 1, 2010, Restriction Requirement.
U.S. Appl. No. 12/047,017, Mail Date Aug. 6, 2010, Office Action.
U.S. Appl. No. 12/053,344, Mail Date Sep. 3, 2010, Notice of Allowance.
U.S. Appl. No. 12/115,337, Mail Date Mar. 4, 2010, Office Action.
U.S. Appl. No. 12/115,337, Mail Date Aug. 20, 2010, Office Action.
U.S. Appl. No. 12/126,717, Mail Date Apr. 7, 2011, Office Action.
Alexander et al., Passive Equalization of Semiconductor Diode Laser Frequency Modulation, Journal of Lightwave Technology, Jan. 1989, 11-23, vol. 7, No. 1.
Binder, J. et al., 10 Gbit/s-Dispersion Optimized Transmission at 1.55 um Wavelength on Standard Single Mode Fiber, IEEE Photonics Technology Letters, Apr. 1994, 558-560, vol. 6, No. 4.
Corvini, P.J. et al., Computer Simulation of High-Bit-Rate Optical Fiber Transmission Using Single-Frequency Lasers, Journal of Lightwave Technology, Nov. 1987, 1591-1596, vol. LT-5, No. 11.
Hyryniewicz, J.V., et al., Higher Order Filter Response in Coupled Microring Resonators, IEEE Photonics Technology Letters, Mar. 2000, 320-322, vol. 12, No. 3.
Koch, T. L. et al., Nature of Wavelength Chirping in Directly Modulated Semiconductor Lasers, Electronics Letters, Dec. 6, 1984, 1038-1039, vol. 20, No. 25/26.
Kurtzke, C., et al., Impact of Residual Amplitude Modulation on the Performance of Dispersion-Supported and Dispersion-Mediated Nonlinearity-Enhanced Transmission, Electronics Letters, Jun. 9, 1994, 988, vol. 30, No. 12.
Lee, Chang-Hee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.
Li, Yuan P., et al., Chapter 8: Silicon Optical Bench Waveguide Technology, Optical Fiber Communications, 1997, 319-370, vol. 111B, Lucent Technologies, New York.
Little, Brent E., Advances in Microring Resonators, Integrated Photonics Research Conference 2003.
Mohrdiek, S. et al., 10-Gb/s Standard Fiber Transmission Using Directly Modulated 1.55-um Quantum-Well DFB Lasers, IEEE Photonics Technology Letters, Nov. 1995, 1357-1359, vol. 7, No. 11.
Morton, P.A. et al., "38.5km error free transmission at 10Gbit/s in standard fibre using a low chirp, spectrally filtered, directly modulated 1.55um DFB laser", Electronics Letters, Feb. 13, 1997, vol. 33(4).

Prokais, John G., Digital Communications, 2001, 202-207, Fourth Edition, McGraw Hill, New York.

Rasmussen, C.J., et al., Optimum Amplitude and Frequency-Modulation in an Optical Communication System Based on Dispersion Supported Transmission, Electronics Letters, Apr. 27, 1995, 746, vol. 31, No. 9.

Shalom, Hamutal et al., On the Various Time Constants of Wavelength Changes of a DFB Laser Under Direct Modulation, IEEE Journal of Quantum Electronics, Oct. 1998, pp. 1816-1822, vol. 34, No. 10.

Wedding, B., Analysis of fibre transfer function and determination of receiver frequency response for dispersion supported transmission, Electronics Letters, Jan. 6, 1994, 58-59, vol. 30, No. 1.

Wedding, B., et al., 10-Gb/s Optical Transmission up to 253 km Via Standard Single-Mode Fiber Using the Method of Dispersion-Supported Transmission, Journal of Lightwave Technology, Oct. 1994, 1720, vol. 12, No. 10.

Yu, et al., Optimization of the Frequency Response of a Semiconductor Optical Amplifier Wavelength Converter Using a Fiber Bragg Grating, Journal of Lightwave Technology, Feb. 1999, 308-315, vol. 17, No. 2.

Dischler, Roman, Buchali, Fred, Experimental Assessment of a Direct Detection Optical OFDM System Targeting 10Gb/s and Beyond, Optical Fiber Communication/National Fiber Optic Engineers Conference, Feb. 24-28, 3 pages, San Diego, CA.

Dong Jae Shin, et al., Low-cost WDM-PON with Colorless Bidirectional Tranceivers, Journal of Lightwave Technology, Jan. 2006, pp. 158-165, vol. 24, No. 1.

Kikuchi, Nobuhiko, et al., Experimental Demonstration of Incoherent Optical Multilevel Staggered-APSK (Amplitude- and Phase-Shift Keying) Signaling, Optical Fiber Communication/National Fiber Optic Engineers Conference, Feb. 24-28, 2008, 3 pages, San Diego, CA.

Kiyoshi Fukuchi, Proposal and Feasibility Study of a 6-level PSK modulation format based system for 100 Gg/s migration, 2007, 3 pages.

Lammert et al., MQW DBR Lasers with Monolithically Integrated External-Cavity Electroabsorption Modulators Fabricated Without Modification of the Active Region, IEEE Photonics Technology Letters, val. 9, No. 5, May 1997, pp. 566-568.

Mahgerefteh, D. and Fan, F., Chirp-managed-laser technology delivers> 250-km reach, Lightwave Online, 2005, PennWell Corporation. Accessed online Jul. 1, 2009 at: http://www.finisar.com/download_31wMeaCML_Application%20White%20Paper-LW.pdf.

Ronald Freund, Dirk Daniel Gross, Matihias Seimetz, Lutz Molle, Christoph Casper, 30 Gbit/s RZ 8-PSK Transmission over 2800 km Standard Single Mode Fibre without Inline Dispersion Compensation, 2007, 3 pages.

Tokle, Torger et al., Advanced Modulation Formats for Transmission Systems, Optical Fiber Communication/National Fiber Optic Engineers Conference, Feb. 24-28, 2008, 3 pages, San Diego, CA.

Sekine, Kenro, et al., Advanced Multi-level Transmission Systems, Optical Fiber Communication/National Fiber Optic Engineers Conference, Feb. 24-28, 2008, 3 pages, San Diego, CA.

Matsui, Yasuhiro et al, Chirp-Managed Directly Modulated Laser (CML), IEEE Photonics Technology Letters, Jan. 15, 2006, pp. 385-387, vol. 18, No. 2.

Nakahara, K. et al, 40-Gb/s Direct Modulation With High Extinction Ratio Operation of 1.3-,um InGaAlAs Multiquantum Well Ridge Waveguide Distributed Feedback Lasers, IEEE Photonics Technology Leters, Oct. 1, 2007, pp. 1436-1438, vol. 19 No. 19.

Sato, K. et al, Chirp Characteristics of 40-Gb/s Directly Modulated Distributed-Feedback Laser Diodes, Journal of Lightwave Technology, Nov. 2005, pp. 3790-3797, vol. 23, No. 11.

Mahgerefteh et al., Chirp managed laser (CML): A compact transmitter for dispersion tolerant 10 Gb/s networking applications; Optical Fiber Communication Conference, 2006 and the 2006 D National Fiber Optic Engineers Conference. OFC 2006, Mar. 5-10, 2006; Digital Object Identifier: 10.1109/OFC.2006.215459.

Wesstrom et al., State-of-the-art performance of widely tunable modulated grating Y-branch lasers; Optical Fiber Communication Conference, 2004. OFC 2004, val. 1, No., pp. 2 val. (1800), Feb. 23-27, 2004; doi: 10.1109/OFC.2004.1349295.

U.S. Appl. No. 12/053,344, Mail Date Apr. 1, 2010, Office Action.
U.S. Appl. No. 12/047,017, Mail Date Sep. 27, 2010, Notice of Allowance.
U.S. Appl. No. 12/014,676, Mail Date Oct. 4, 2010, Office Action.
U.S. Appl. No. 12/025,573, Mail Date Oct. 6, 2010, Office Action.
U.S. Appl. No. 12/028,675, Mail Date Oct. 27, 2010, Office Action.
U.S. Appl. No. 12/115,337, Mail Date Oct. 28, 2010, Notice of Allowance.
U.S. Appl. No. 12/017,957, Mail Date Nov. 5, 2010, Office Action.
U.S. Appl. No. 12/184,137, Mail Date Dec. 2, 2010, Notice of Allowance.
U.S. Appl. No. 12/028,678, Mail Date Dec. 8, 2010, Office Action.

* cited by examiner

METHOD AND APPARATUS FOR GENERATING SIGNALS WITH INCREASED DISPERSION TOLERANCE USING A DIRECTLY MODULATED LASER TRANSMITTER

CROSS-REFERENCE TO RELATED APPLICATIONS

This application claims the benefit of U.S. Provisional Application Ser. No. 60/881,637, filed Jan. 22, 2007.

BACKGROUND OF THE INVENTION

1. The Field of the Invention

This application relates to optical transmitters.

2. The Relevant Technology

In optical communication systems, it is important that optical signals propagate through dispersive optical fiber without being severely distorted. The quality of a transmitted digital signal may be characterized by measuring the bit error rate (BER) of the signal in a receiver after propagation through a length of fiber and by determining the optical signal-to-noise ratio (OSNR) required at the receiver to obtain a certain BER, typically around $10^{-9}$ This OSNR is then compared with the OSNR required to obtain the same BER directly at the output of the transmitter, and the ratio of these two levels is called the dispersion penalty, which is often expressed in decibels (dB). The largest dispersion penalty that a fiber optic transmission system can tolerate without significant performance degradation is typically between 1 and 2 dB.

The amount of group-velocity dispersion (GVD) at which the dispersion penalty reaches the allowed value depends on the transmitted data rate and the modulation format. At a data rate of 10 Gb/s, for example, binary on-off keyed optical signals in NRZ format typically can tolerate up to about 1400 ps/nm GVD without incurring a dispersion penalty of more than 1 dB, thus allowing transmission over about 80 km of standard single-mode fiber at 1550 nm wavelength without needing optical or electrical dispersion compensation, whereas under the same conditions optical duobinary signals and signals generated by laser transmitters as described in U.S. patent application Ser. No. 10/289,944, filed on Nov. 6, 2002, application number US2005000037718, can tolerate accumulated GVD of up to 3400 ps/nm.

However, optical signals frequently need to be transmitted over distances for which the accumulated GVD in the fiber is substantially larger than 3400 ps/nm. A general solution for transmitting optical signals over such distances without exceeding the allowed dispersion penalty is to insert dispersion-compensating modules periodically along the optical transmission fiber. However, these dispersion-compensating modules are generally expensive and also increase the overall transmission loss in the system significantly. Alternatively, one may pre-distort the launched signals in the transmitter in such a way that the GVD in the dispersive fiber transforms them into the desired waveform required for error-tree detection at the receiver. This technique is known as electrical pre-compensation of the transmitted signals. However, such pre-compensation typically requires the use of an additional optical modulator in the transmitter, which also increases the cost and complexity of the system substantially.

It is well known to those skilled in the art that pre-compensation of the transmitted optical signals can substantially improve the distance over which the signals can be transmitted without requiring intermediate dispersion-compensating modules. However, electrical pre-compensation of signals in conventional modulation formats, such as on-off-keyed or phase-keyed signals in NRZ or RZ format, requires independent modulation of the optical amplitude and phase of the transmitted signal, and hence, two optical modulators that are driven by two independent electrical signals.

Alternatively, one may employ a directly modulated laser source together with an external modulator. Whereas in principle, such transmitters can pre-compensate arbitrarily large amounts of GVD, they tend to be expensive and consume substantially more electrical drive power than conventional optical transmitters because of additional electrical circuitry required for operating the two modulators. Therefore, transmitters generating electrically pre-compensated signals also add substantial cost and complexity to the system. This disadvantage is particularly important in systems where the accumulated GVD in the transmission fiber is only moderately larger than the dispersion tolerance of optical signals without pre-compensation.

BRIEF SUMMARY OF THE INVENTION

The present invention describes a simple and relatively inexpensive method to generate optical signals at a data rate of 10 Gb/s that can tolerate up to 4600 ps/nm accumulated GVD with less than 1 dB dispersion penalty. These signals are generated with a directly modulated laser transmitter followed by a passive optical spectrum reshaper, wherein the laser is modulated with a prescribed, pre-distorted drive current, which is derived from a conventional NRZ-formatted digital information signal via simple electronic circuitry.

In one aspect of the invention, an apparatus for transmitting optical signals includes an optical signal source, such as a laser, and a driving circuit coupled to the optical signal source. The optical signal source may be optically coupled an optical spectrum reshaper that converts frequency modulation of the optical signal to amplitude modulation. The driving circuit is operable to convert a data signal into a drive signal provided to the optical signal source, the drive signal comprising a combination of a modulated signal encoding the data signal and a compensation signal proportional to a time derivative of the modulated signal. In some embodiments, the time derivative is added to the modulated signal only on the falling edges of the modulated signal. In embodiments of the invention, the time derivative is generated by a first order high-pass filter.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

In some embodiments of the present invention, the dispersion tolerance of optical signals generated by transmitters is substantially improved, wherein the laser source is modulated with a pre-distorted electrical signal that is substantially different from the modulating signal used in conventional transmitters. The novel methods disclosed may be used with transmitters such as those disclosed in U.S. patent application Ser. No. 11/068,032, filed Feb. 28, 2005, and entitled "Optical System Comprising an FM Source and a Spectral Reshaping Element"; U.S. patent application Ser. No. 10/289,944, filed Nov. 6, 2002, and entitled "Power Source For a Dispersion Compensation Fiber Optic System"; U.S. patent application Ser. No. 10/308,522, filed Dec. 3, 2002, and entitled "High-Speed Transmission System Comprising a Coupled Multi-Cavity Optical Discriminator"; U.S. patent application Ser. No. 10/680,607, filed Oct. 6, 2003, and entitled "Flat Dispersion Frequency Discriminator"; and U.S. patent application Ser. No. 11/068,032, filed Feb. 28, 2005, and entitled "Optical System Comprising an FM Source and a Spectral Reshaping Element," which are all hereby incorporated by reference.

For purposes of this application, a conventional transmitter is one wherein a directly modulated laser emits a signal through an optical spectrum reshaper to enhance the amplitude modulation, pulse shape, and/or extinction ratio of adiabatically chirped pulses output by the laser.

The amplitude and phase of signals generated by such transmitters modulated in accordance with embodiments of the present invention substantially resemble those of pre-compensated optical signals. An important advantage of this method is that it does not require additional optical components in the transmitter or elsewhere in the system.

Transmitters modulated according to the method described herein below, preferably include a directly modulated laser and a passive optical filter, or optical spectrum reshaper (OSR). The OSR may be embodied as one or more filters, including, but not limited to, a coupled multi-cavity (CMC) filter, a periodic multi-cavity etalon, a fiber Bragg grating, a ring resonator filter, or any other optical element having a wavelength-dependent loss. The OSR may also comprise a fiber, a Gire-Tournois interferometer, or some other element with chromatic dispersion.

The laser in these transmitters is preferably operated well above its lasing threshold and modulated by a time-varying electrical signal that carries the digital information to be transmitted, typically an on-off-keyed signal in NRZ format. In response to this modulation, the optical frequency of the laser output signal varies in a continuous fashion with the amplitude of the modulating signal. This modulation is known as continuous-phase frequency modulation (CP-FM). In addition, the intensity of the laser output signal may also vary in response to the modulating signal, which is known as residual amplitude modulation (AM). However, the residual AM is usually small in such transmitters and, hence, will be neglected in the following description of the invention.

In an ideal CP-FM transmitter, the optical frequency of the laser changes proportionally to the amplitude variations in the modulating signal. This effect is referred to as adiabatic chirp. Practical lasers, however, may also exhibit additional frequency deviations that are not proportional to the amplitude variations in the modulating signal. These additional frequency deviations typically occur near the rising and falling edges of the modulating pulses and, hence, are referred to as transient chirp. The magnitude of this transient chirp is determined by the relaxation oscillation frequency of the laser, $f_r$, which, in turn, depends on the bias current applied to the active laser medium.

The transient chirp is particularly large when the laser is operated close to its lasing threshold. In experiments and through numerical simulations it has been found that transient chirp in the laser output can significantly improve the dispersion tolerance of the transmitted optical signals. However, to generate sufficiently large transient chirp in the laser output, the laser needs to be operated relatively close to its lasing threshold, which is generally undesirable for other reasons. Furthermore, the amount of transient chirp generated in the laser output is difficult to control and may vary substantially from one laser to another. Therefore, in the present invention we disclose a method and means for introducing electrically controllable frequency deviations in the laser output that are substantially equal to the frequency deviations caused by transient chirp. In the following, these electrically controlled frequency deviations shall be referred to as artificial transient chirp.

Figure 1:
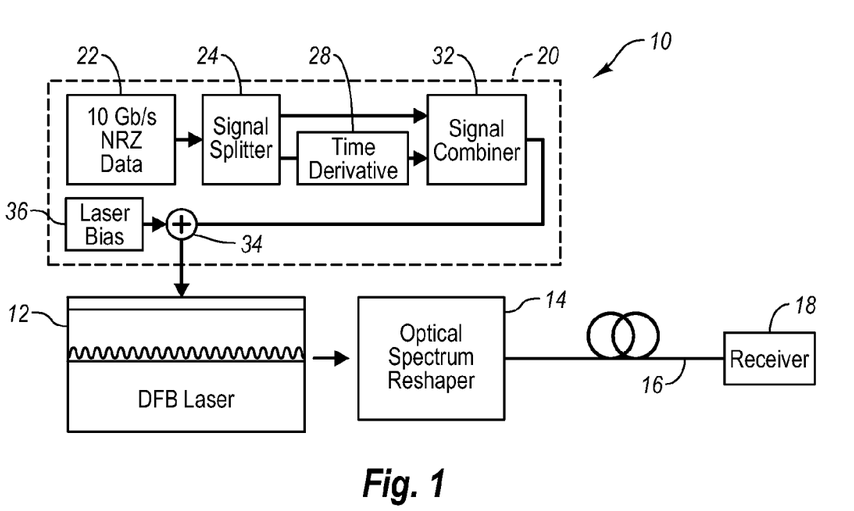
FIG. 1 is a schematic block diagram of a control circuit and laser in accordance with an embodiment of the present invention.

In a preferred embodiment of the invention, shown in FIG. 1, a transmitter 10 includes an optical signal source such as a laser 12. The output of the laser 12 is transmitted through an OSR 14 and an optical fiber 16 to a receiver 18. The optical fiber 16 typically includes a dispersive material and has an optical path length. A controller 20 is coupled to the laser 12 in order to modulate the laser to encode data in the output signal of the laser.

The laser 12 is operated at a point well above its lasing threshold and the gain in the active laser medium is modulated by the controller 20 in proportion to a prescribed combination of an NRZ signal to be transmitted and a signal that represents the first time derivative of the NRZ signal, so as to generate a desired combination of adiabatic chirp and artificial transient chirp in the laser output signal.

In another preferred embodiment of the invention, a desired combination of adiabatic chirp and artificial transient chirp is generated in the laser output signal by the controller 20 by modulating the gain in the active laser medium in proportion to a prescribed combination of the NRZ signal to be transmitted and a signal that represents both first and higher time derivatives of the modulating NRZ signal.

In some embodiments, the artificial transient chirp has a magnitude chosen according to an optical path length between the transmitter 12 and the receiver 18, such as the length of the optical fiber 16, such that the transient chirp substantially compensates for dispersion experienced by pulses traveling from the transmitter 12 to the receiver 18. For example, the artificial transient chirp may have a magnitude effective to substantially compensate for dispersion caused by the fiber 16. In some embodiments, the artificial transient chirp has a magnitude sufficient to compensate for between 80 and 120 percent of the dispersion experienced by the pulses travelling from the transmitter 12 to the receiver 18.

Figure 2:
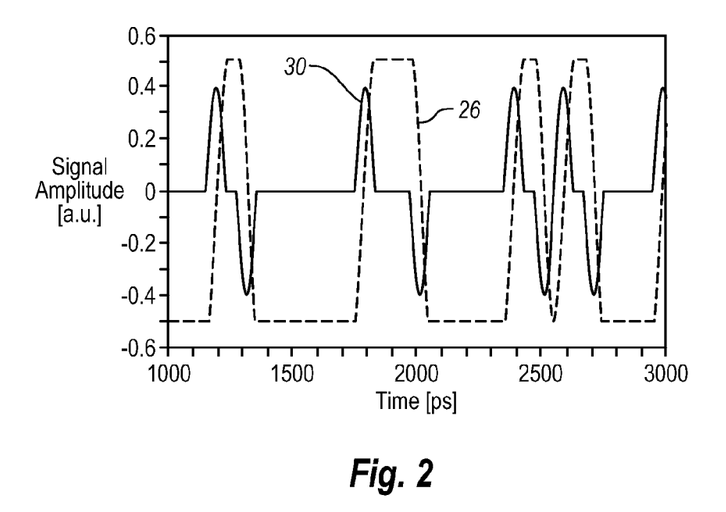
FIG. 2 is a plot of a modulating signal and a time derivative of the modulating signal in accordance with an embodiment of the present invention.

As shown in FIG. 1, a modulating signal may be generated by coupling a data signal from a digital signal source 22 to a signal splitter 24. The data signal may be an NRZ signal 26 such as is illustrated in FIG. 2. A portion of the data signal is input to a differentiator 28 that outputs a time derivative of the data signal, such as the time derivative 30 of FIG. 2. The time derivative signal 30 may be either a first order time derivative or a combination of a first order time derivative with higher order derivatives. The output of the differentiator 28 may be proportional but not necessarily equal to the time derivative, or derivatives, of the data signal. The data signal and the output of the differentiator 28 are then combined by a signal combiner 32. The output of the combiner is coupled to a summer 34 as is a laser bias signal source 36 providing a bias signal. The output of the summer is then input to the laser 12.

Figure 3:
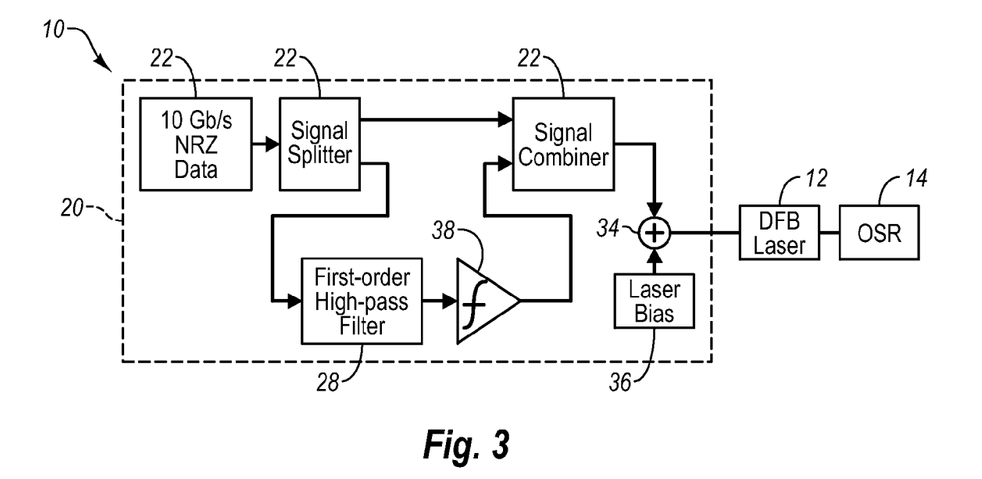
FIG. 3 is a schematic block diagram of an alternative embodiment of a control circuit and laser in accordance with an embodiment of the present invention.
Figure 4:
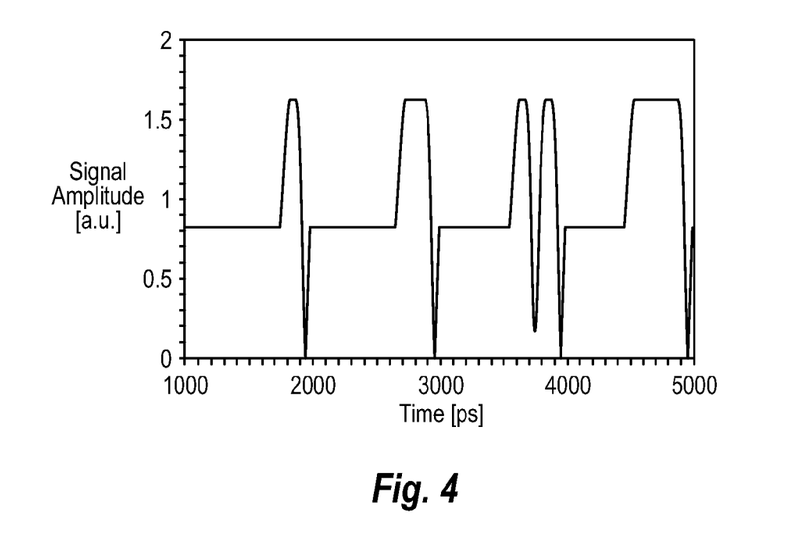
FIG. 4 is a plot of a pre-compensated signal including a time derivative component combined with a modulating signal only on the falling edges of the modulating signal in accordance with an embodiment of the present invention.

Referring to FIG. 3, in a third preferred embodiment of the invention, artificial transient chirp is generated in the laser output signal only during certain prescribed time intervals. For example, the time derivatives of the NRZ signal are added to the modulating signal only near the falling edges of the modulating NRZ pulses resulting in the signal of FIG. 4 in which artificial transient chirp occurs only near the falling edges of the NRZ signal. For example, a weighted half-rectified derivative of the modulated signal, having a non-zero magnitude only where the time derivative is negative, may be added to the modulating signal. Stated mathematically, the signal combined with the modulating signal is proportional to $H(-\dot{S}(t))$, where $\dot{S}(t)$ is the time derivative of the modulated signal and $H(x)$ is the Heaviside Step function.

In such embodiments, the controller 20 may include a threshold amplifier 38 that receives the output of the differentiator 28 and outputs only the negative time derivative occurring at the falling edges. The output of the threshold amplifier 38 is then recombined with the original data signal, such as by the summer 34 and input to the laser 12.

In some embodiments, the differentiator 28 may be embodied as a first order high-pass filter, as in the embodiment of FIG. 3. The first order high-pass filter may be embodied as a first-order Butterworth filter or a transversal electrical filter with two or more taps.

In another preferred embodiment of the invention, the magnitude of the adiabatic chirp in the laser output is substantially reduced compared to that in conventional transmitters used in combination with an OSR, which is typically 50% of the bit rate frequency (i.e. 5 GHz at a data rate of 10 Gb/s), so that said reduction of the adiabatic chirp further improves the dispersion tolerance of the transmitted signals when artificial transient chirp is added to the adiabatic chirp in the laser output. In one embodiment, the adiabatic chirp of the pulses is between 40 and 50% of the bit rate frequency. In another embodiment, the adiabatic chirp of the pulses is between 30 and 40% of the bit rate frequency.

Figure 5:
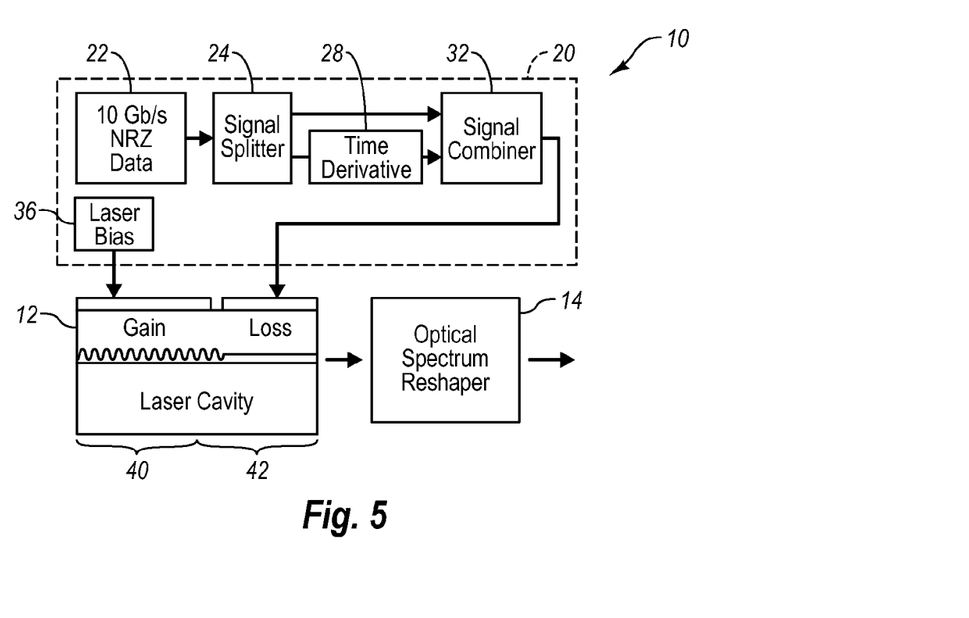
FIG. 5 is a schematic block diagram of another alternative embodiment of a control circuit and laser in accordance with an embodiment of the present invention.

Referring to FIG. 5, in another embodiment, the laser bias signal source 36 is coupled to a gain section 40 of the laser 12. The bias signal is preferably held at a substantially constant value, such that the laser operates well above its lasing threshold. The modulation signal, such as the output of the signal combiner 32, is coupled to a loss section 42 of the laser. The optical transmission loss in the laser cavity is modulated in proportion to a prescribed combination of the NRZ signal to be transmitted and a signal that represents time derivatives of the NRZ signal, so as to generate a desired combination of adiabatic chirp and artificial transient chirp in the laser output signal. A number of FM source using loss modulation, including intra-cavity loss modulation, have been disclosed in U.S. patent application Ser. No. 11/787,163, filed Apr. 13, 2007, and entitled "Optical FM Source Based on Intra-Cavity Phase and Amplitude Modulation in Lasers," which is incorporated herein by reference.

Figure 6:
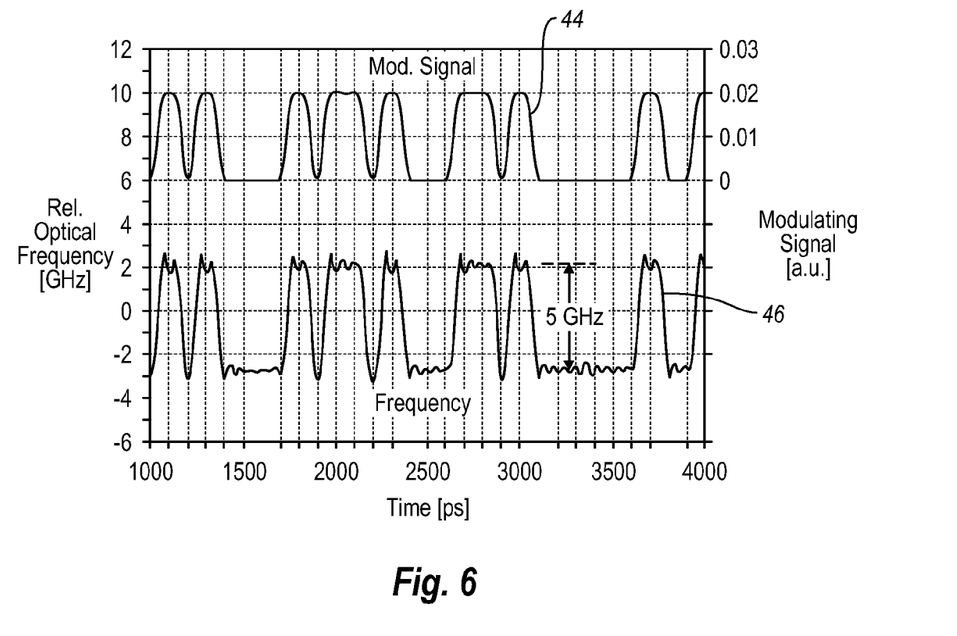
FIG. 6 is a plot of an uncompensated modulating signal and laser output.

In transmitters suitable for use in accordance with the present invention, the gain of the DFB laser (or alternatively, in the case of a loss-modulated laser of FIG. 5, the loss in the loss section of the laser cavity) is modulated in proportion to a time-varying digital signal S(t), which is typically in non-return-to-zero (NRZ) format. FIG. 6 shows an example of one such modulating signal 44 at a data rate of 10 Gb/s. It also displays the resulting frequency chirp in the output 46 of an OSR 14 receiving the modulated output of the laser 12, obtained through numerical simulation of a laser 12 and OSR 14 in which S(t) modulates the loss in the laser cavity.

Clearly, the frequency deviations in the laser output are substantially proportional to S(t), which indicates negligible transient chirp. Hence, in the absence of residual AM, the normalized optical amplitude of the laser output signal is simply given by $a(t) = e^{j\Phi(t)}$, where $$\frac{\partial}{\partial t}\phi(t) = \omega(t)$$

denotes relative angular optical frequency with $\omega(t) \propto S(t)$.

This frequency modulation is then converted into amplitude modulation by the OSR 14 having a frequency-dependent transfer function $H_{filt}(\omega) = A + B\omega + C\omega^2 + D\omega^3 + \ldots$, whose shape and bandwidth have been disclosed in U.S. Pat. No. 7,054,538, entitled "Flat dispersion frequency discriminator," which is hereby incorporated by reference. One may describe the effects of the optical spectrum reshaper 14 in the time domain by the complex operator $$h_{filt}(t) = A - jB\frac{\partial}{\partial t} - C\frac{\partial^2}{\partial t^2} + jD\frac{\partial^3}{\partial t^3} + \ldots,$$

so that the amplitude at the output signal of the transmitter 10 is calculated according to:

$$h_{filt}(t)a(t) \approx a(t)[A+B\omega-jC\dot{\omega}+C\omega^2-D\ddot{\omega}-j3D\dot{\omega}\omega+D\omega^{3+}\ldots]$$   Equation 1 where $$\dot{\omega}(t) = \frac{\partial}{\partial t}\omega(t) \text{ and } \ddot{\omega}(t) = \frac{\partial}{\partial t}\dot{\omega}(t).$$

Figure 7:
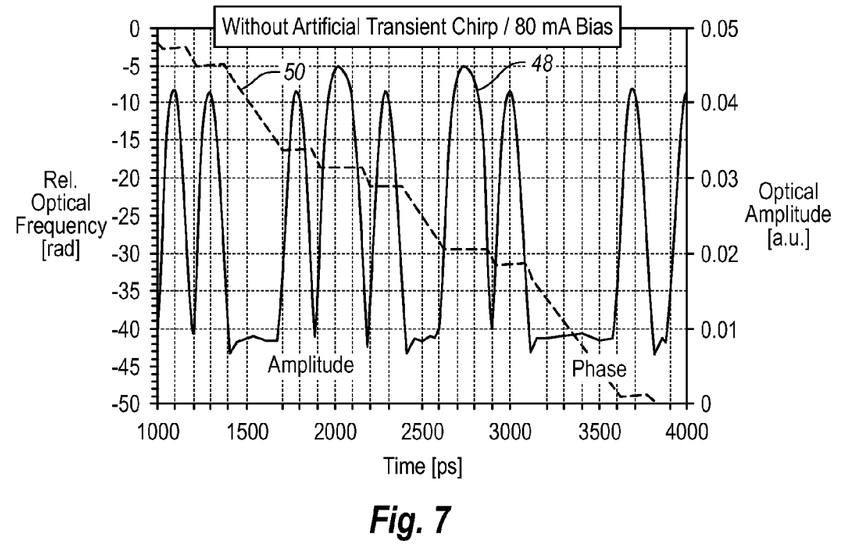
FIG. 7 is a plot of amplitude and phase of a laser output in response to an uncompensated modulating signal.

FIG. 7 displays the results of a numerical simulation of the amplitude 48 and phase variations 50 in this signal, in which it is assumed that the laser exhibits the same frequency chirp as shown in FIG. 6.

It is well known in the art that the frequency deviations of sufficiently small transient chirp are approximately proportional to the time derivative of the modulating signal. Therefore, artificial transient chirp may be generated in the laser output by adding a fixed amount of the time derivative of the NRZ signal to the modulating signal of the laser. Therefore, in a preferred embodiments of the invention, the laser 12 in the transmitter 10 is modulated with a pre-distorted signal of the form $S(t)+\alpha\dot{S}(t)$, where $$\dot{S}(t) = \frac{\partial}{\partial t}S(t) \text{ and } \alpha$$

is a constant factor. It is well known to those skilled in the art that an electrical signal proportional to the time derivative $\dot{S}(t)$ can be generated by passing a portion of S(t) through a first order electrical high-pass filter, which may be a first-order Butterworth filter or a transversal electrical filter with two or more taps.

Figure 8:
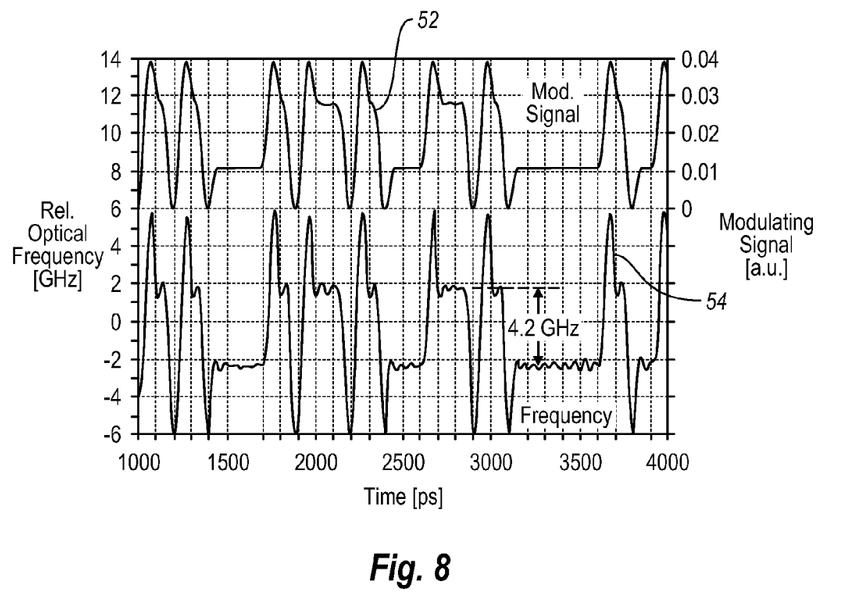
FIG. 8 is a plot of a pre-compensated modulating signal and corresponding laser output in accordance with an embodiment of the present invention.

FIG. 8 shows an example of such pre-distorted drive signal, including the amplitude 52 of the modulating signal and the amplitude 54 of the output of the laser 12, with $\alpha \approx 30$ ps. FIG. 8 also shows the resulting frequency variations in the laser output signal, obtained by numerical simulations, in which it is assumed that $S(t)+\alpha\dot{S}(t)$ modulates the propagation loss in the laser cavity. As can be clearly seen, the frequency deviations in the laser output 54 are substantially proportioned to the modulating signal $S(t)+\alpha\dot{S}(t)$.

Therefore, the optical output signal of a laser modulated according to $S(t)+\alpha\dot{S}(t)$ may be described by $a_{pd}(t)=e^{j\phi_{pd}(t)}$, where $$\frac{\partial}{\partial t}\phi_{pd}(t) = \omega(t) + \alpha\dot{\omega}(t).$$

Figure 9:
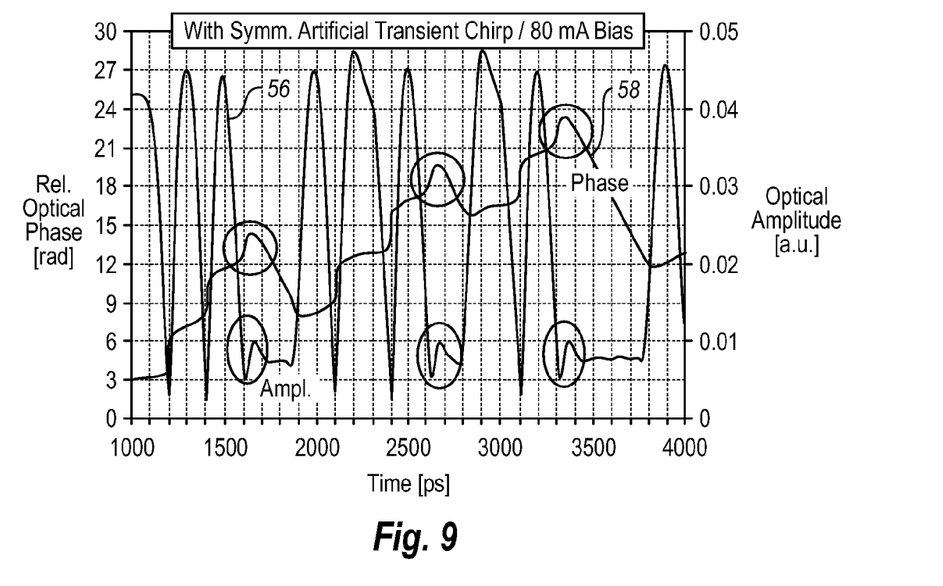
FIG. 9 is a plot of the amplitude and phase of a laser output modulated with a pre-compensated modulating signal in accordance with an embodiment of the present invention.

The optical spectrum reshaper 14 then converts this signal into a signal having an amplitude 56 and phase 58, as shown in FIG. 9, which is described by:

$$h_{filt}(t)a_{pd}(t) \approx [A + B\omega - jC\dot{\omega} + C\omega^2 - D\ddot{\omega} - j3D\dot{\omega}\omega + D\omega^3 + \ldots + B(\alpha\dot{\omega}) - jC(\alpha\ddot{\omega}) +$$   Equation 2

$$2C\omega(\alpha\dot{\omega}) + C(\alpha\dot{\omega})^2 - j3D\dot{\omega}(\alpha\dot{\omega}) + \ldots ]a_{pd}(t)$$

Experiments conducted by the inventors have found that the output signals of such pre-distorted transmitters in accordance with embodiments of the invention are very similar to the output signals of a conventional transmitter after having experienced negative GVD of about $-2000$ ps$^2$ in a dispersion-compensating module.

Figure 10:
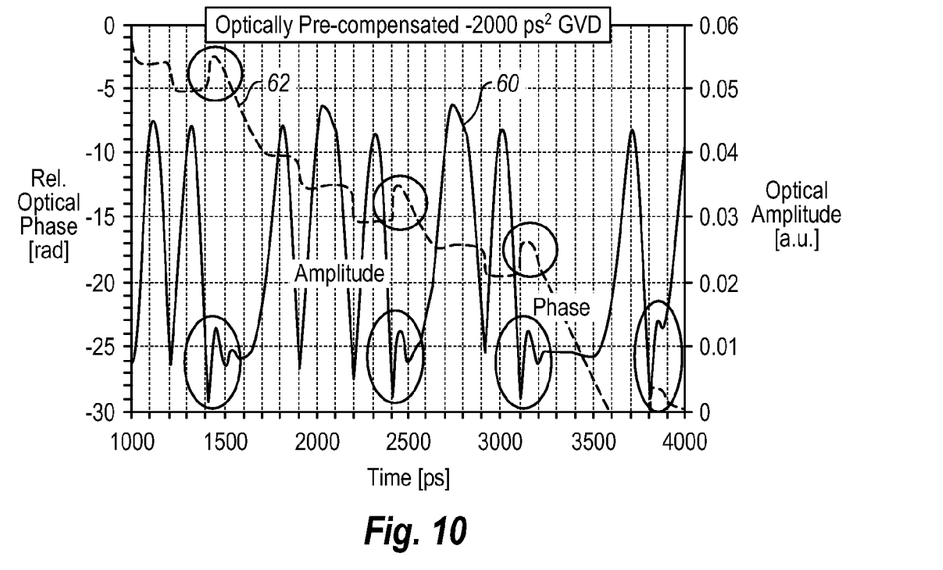
FIG. 10 is a plot of the amplitude and phase of an optically compensated optical signal.

An example of such optically pre-compensated signal, including the amplitude 60 and phase 62, is displayed in FIG. 10. Comparison of the amplitude and phase variations in the signals of FIGS. 9 and 10 reveals that both signals exhibit a substantial dip in their amplitudes 56, 60 at the falling edges of the NRZ pulses, especially when a digital '1' is followed by more than one digital '0'. Moreover, these dips are always accompanied by substantial bumps in the optical phase 58, 62 (as marked by circles in FIGS. 9 and 10). It should be noted that these features are substantially absent from the output signals of a conventional transmitter that have not experienced GVD, such as the amplitude 48 and phase 50 shown in FIG. 7.

The similarity between the pre-distorted signals of FIG. 7 and the optically pre-compensated signals of FIG. 8 can also be shown through mathematical analysis. GVD in a dispersion-compensating module can be described by a frequency-dependent transfer function $H_{gvd}(\omega)=e^{(j\beta_2 L\omega^2/2)}$, where $\beta_2 L$ denotes the accumulated GVD in the fiber. For sufficiently small values of $|\beta_2 L\omega^2/2|$ one may approximate $H_{gvd}$ as $H_{gvd}(\omega) \approx 1+j\beta_2 L\omega^2/2$, so that in the time domain, one can approximate the effect of GVD on the transmitted signals by the operator $$h_{gvd}(t) \approx 1 - (j\beta_2 L/2)\frac{\partial^2}{\partial t^2}.$$

In this approximation, the output signal of a conventional transmitter after having experienced GVD becomes:

$$a(t)[A + B\omega - jC\dot{\omega} + C\omega^2 - D\ddot{\omega} - j3D\dot{\omega}\omega + D\omega^3 + \ldots +$$   Equation 3

$$(A\beta_2 L/2)\ddot{\omega} + j(A\beta_2 L/2)\omega^2 - j(B\beta_2 L/2)\dddot{\omega} +$$

$$3(B\beta_2 L/2)\dot{\omega}\omega + j(B\beta_2 L/2)\omega^3 + \ldots ] \approx$$

$$\{[A + B\omega - jC\dot{\omega} + C\omega^2 - D\ddot{\omega} - j3D\dot{\omega}\omega + D\omega^3 + \ldots]$$

$$e^{j\beta_2 L\omega^2/2} + (A\beta_2 L/2)\ddot{\omega} -$$

$$j(B\beta_2 L/2)\dddot{\omega} + 3(B\beta_2 L/2)\dot{\omega}\omega + \ldots \}a(t)$$

With these expressions it can be easily shown that GVD not only introduces a phase shift of $\beta_2 L\omega^2/2$ in the optical output signals of the transmitter, but that it also produces additional terms that are proportional to $\dot{\omega}$ and $\ddot{\omega}$, respectively. Since $\|\beta_2 L\omega^2/2\| \leq 0.37$ for $\|\beta_2 L\| \leq 3000$ ps$^2$ and $\|\omega(t)/2\pi\| \leq 2.5$ GHz, the predominant effect of GVD on the transmitted signal is described by the additional terms $(A,\beta_2 L/2)\ddot{\omega}$, $-j(B,\beta_2 L/2)\dddot{\omega}$, and $(3B\beta_2 L/2)\dot{\omega}\omega$, which are proportional to the time derivatives of the modulating signal $\dot{S}(t)$ and $\ddot{S}(t) = \frac{\partial}{\partial t}\dot{S}(t)$.

Furthermore, a comparison of Equations 2 and 3 reveals that the additional terms introduced by GVD in the output signals of a conventional transmitter exhibit a similar form as those introduced by modulating the transmitter with the pre-distorted signal. Indeed, one finds the following correlations of Equation 4 between the additional terms in Equations 2 and 3:

$$+A\beta_2 L/2)\dot{\omega} \leftrightarrow +B(\alpha\dot{\omega}) - j(B\beta_2 L/2)\ddot{\omega} \leftrightarrow \quad \text{Equation 4}$$
$$-jC(\alpha\ddot{\omega}) + 3B\beta_2 L/2)\dot{\omega}\omega \leftrightarrow +2C(\alpha\dot{\omega})\omega$$

It is easily verified that the two terms in the first row of Equation 4 are equal when $\alpha=(\beta_2 L/2)A/B$ and, furthermore, those in the second row when $A/B=B/C$. However, under these conditions the two terms in the third row in Equation 4 differ by a factor of 1.5. Nevertheless, for sufficiently small GVD, the pre-distorted output signals of Equation 2 are very similar to the output signals of Equation 3 from a conventional transmitter after having experienced negative GVD. Hence, it follows that the output signals of a pre-distorted transmitter modulated by $S(t)+\alpha\dot{S}(t)$ can tolerate substantially more GVD than the output signals of a conventional transmitter.

Figure 11A:
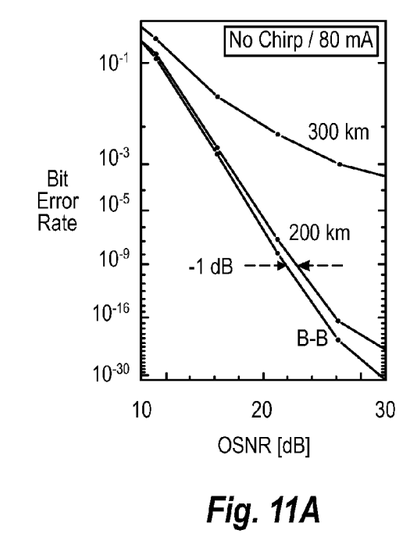
FIGS. 11A and 11B are plots relating the bit error rate of uncompensated optical signals and pre-compensated signals in accordance with an embodiment of the present invention.
Figure 11B:
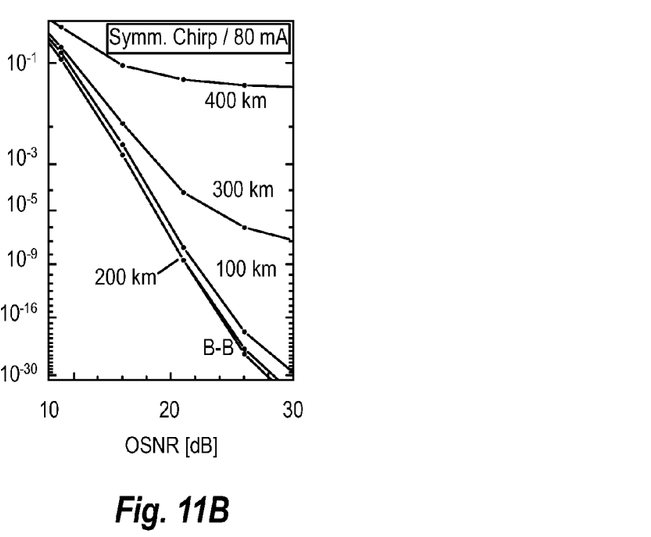

FIG. 11A displays results of numerical simulations of the dispersion tolerance of signals generated by a conventional transmitter. FIG. 11B displays results of numerical simulations of the dispersion tolerance of signals generated by a pre-distorted transmitter, in which the laser is modulated with the drive signals shown in FIG. 8. The curves in FIGS. 11A and 11B display the BER in the received signal as a function of OSNR after the signals have been transmitted through various lengths of standard single-mode fiber (SSMF) having GVD of 17 ps/nm/km. As expected, the signals generated by the conventional transmitter exhibit a dispersion penalty of about 1 dB after transmission through 200 km SSMF (i.e. after having experienced 3400 ps/nm accumulated GVD), whereas the signals generated by the pre-distorted transmitter (with $\alpha=30$ ps) do not show a significant penalty at after traversing 200 km SSMF. At longer transmission distances, the dispersion penalties are substantially smaller for signals generated by the pre-distorted transmitter than for those generated by the conventional transmitter. In fact, the signals generated by the pre-distorted transmitter exhibit a dispersion tolerance that is about 850 ps/nm (or ~1000 ps$^2$) higher than those generated by the conventional transmitter. It should be noted that the dispersion tolerance of the signals from the pre-distorted transmitter are optimized by reducing the peak-to-peak frequency deviation of the adiabatic frequency chirp in the DFB laser to only 4.2 GHz (c.f. FIG. 8), which is substantially smaller than 5-GHz peak-to-peak frequency deviations in the conventional transmitter.

However, the dispersion tolerance of the pre-distorted signals is still substantially smaller than that expected from the relation $\beta_2 L \approx 2\alpha B/A$ in Equation 4. This discrepancy can be attributed to undesired additional terms that appear in Equation 2 but are not found in Equation 3, i.e. the terms $C(\alpha\dot{\omega})^2$ and $j3D\dot{\omega}(\alpha\dot{\omega})$. The term $C(\alpha\dot{\omega})^2$, for instance, is always either positive or negative (depending on the sign of C) and, hence, can substantially offset the effects of the desired term $B(\alpha\dot{\omega})$ in Equation 2.

For this reason, it is advantageous to pre-distort the modulating signal of the laser only over certain time intervals. Numerical simulations have shown that the dispersion tolerance of the signals further improves when the time derivative a $\alpha S\dot{S}(t)$ is added to S(t) only near the falling edges of S(t) as shown in FIG. 10. Such asymmetric pre-distortion of the modulating signals generates artificial transient chirp only at the falling edges of the NRZ pulses, i.e. when $\dot{S}(t)$ is negative, and is therefore referred to as negative-only transient chirp.

Figure 12:
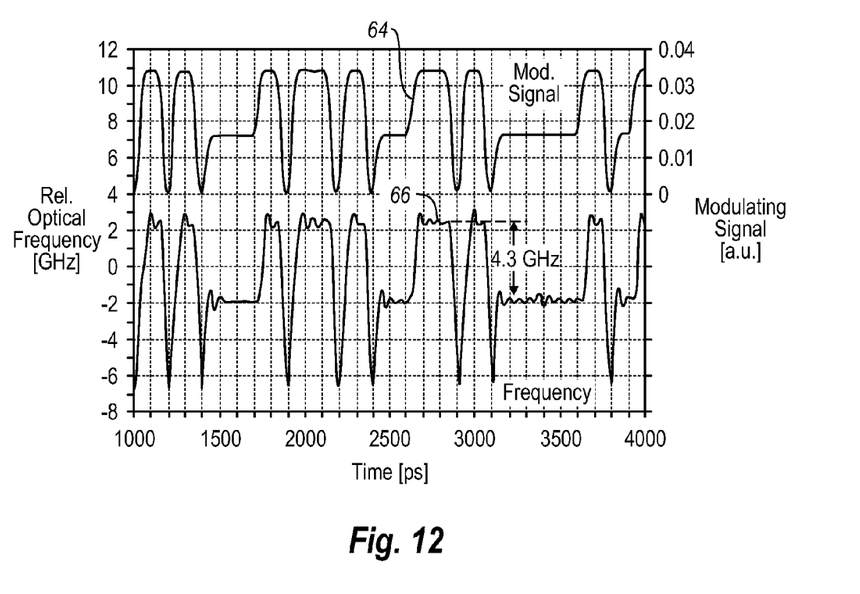
FIG. 12 is a plot of a pre-compensated modulating signal including a time derivative component added only on the falling edges of the modulating signal and a corresponding output of a laser in accordance with an embodiment of the present invention.
Figure 13A:
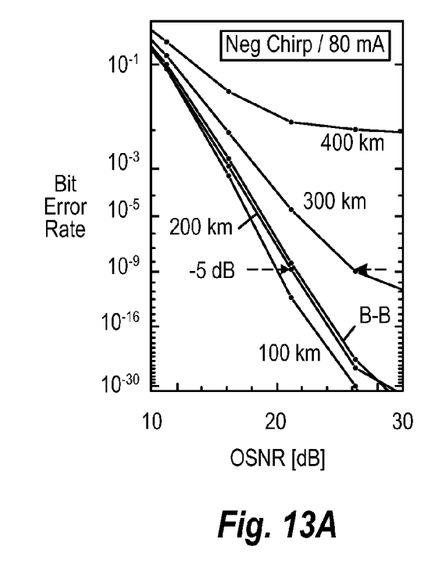
FIGS. 13A and 13B are plots relating the bit error rate of modulating signals having differing bias levels in accordance with an embodiment of the present invention.

Numerical simulations with such asymmetrically pre-distorted signals reveal that their dispersion tolerance is about 1000 ps/nm (or ~1200 ps$^2$) higher than that of signals from a conventional transmitter. As can be seen in FIG. 13, the dispersion penalty of pre-distorted signals with negative-only transient chirp is even negative after transmission through 100 km SSMF and vanishes after transmission through 200 km SSMF. Even after transmission through 300 km SSMF (corresponding to 5100 ps/nm GVD) the dispersion penalty is only 5 dB. Again, the peak-to-peak frequency deviation of the adiabatic chirp in the CML transmitter is reduced here to about 4.3 GHz to maximize the dispersion tolerance of the signals, as illustrated by the modulating signal 64 and laser output signal 66 shown in FIG. 12.

Figure 13B:
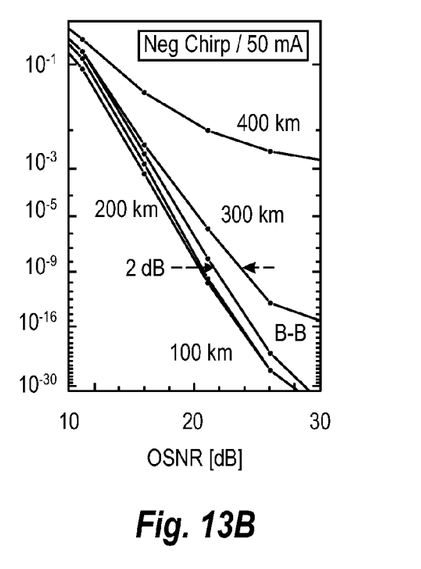
Figure 14:
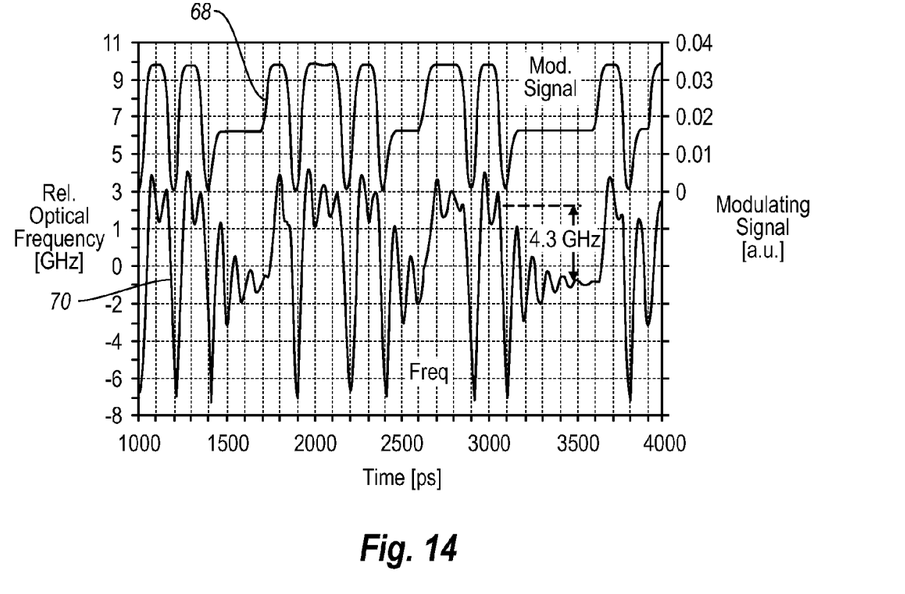
FIG. 14 is a plot showing a modulating signal with reduced bias and a corresponding laser output with a ringing component in accordance with an embodiment of the present invention.

Furthermore, operating the laser closer to threshold increases the dispersion tolerance of such asymmetrically pre-distorted signals even further. This can be accomplished, for example, by reducing the bias current applied to the active gain medium from 80 mA, as assumed in FIG. 13A, to only 50 mA, as assumed in FIG. 13B. As shown in FIG. 14, in this mode of operation, a modulating signal 68 causes a laser output 70 to exhibit significant 'ringing' in its output frequency, especially at those times when $\dot{S}(t)$ is added to the modulating signal.

The ringing in the frequency response arises from natural transient chirp, which IS substantially larger when the laser operated close to threshold. However, this combination of artificial and natural transient chirp improves the dispersion tolerance of the optical signals by about 1200 ps/nm (~1400 ps$^2$), as shown in FIG. 13B. Hence, such pre-distorted signals can be transmitted over 270 km SSMF (i.e. ~4600 ps/nm accumulated GVD) with a dispersion penalty of less than 1 dB. Even after transmission through 300 km SSMF the dispersion penalty does not exceed 2 dB.

Figure 15:
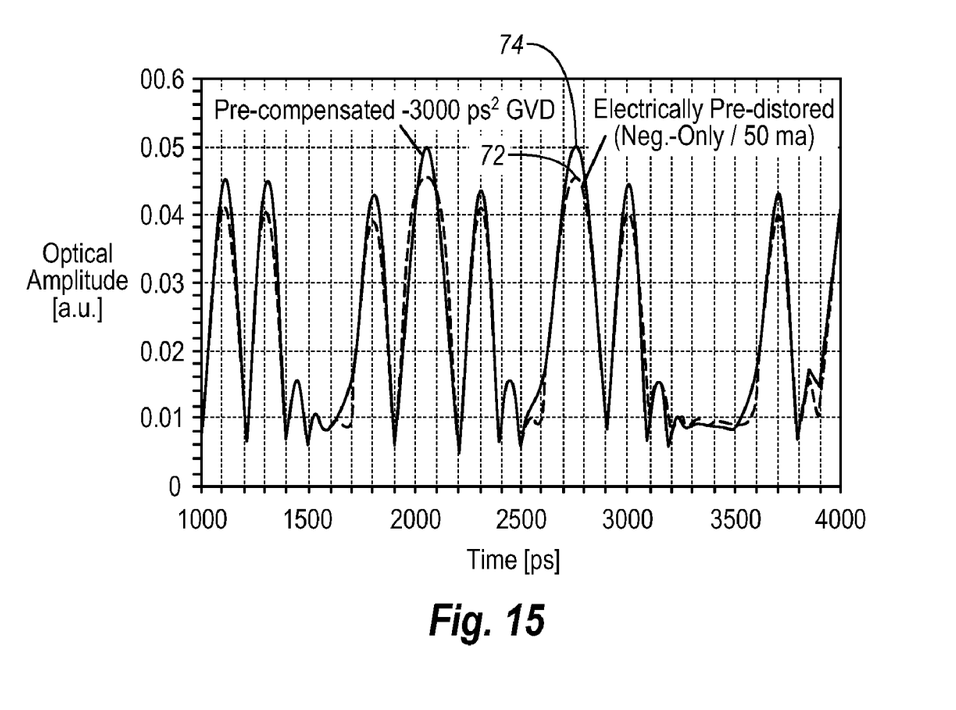
FIG. 15 is a plot relating the amplitude of an optically compensated optical signal to the amplitude of an electrically pre-compensated laser output to in accordance with an embodiment of the present invention.

The reason for this improved dispersion tolerance may be explained with reference to FIG. 15. The ringing in the frequency response of the laser causes a similar but smaller ringing in the output amplitude 74 of the transmitter near the falling edges of the pulses, as shown in FIG. 15, which is very similar to the amplitude ringing observed m signals 76 from conventional transmitters that are optically pre-compensated with −3000 ps$^2$ GVD. This can be clearly seen in FIG. 15, where the amplitude variations of the signals 74 from the pre-distorted transmitter are compared with signals 76 from the pre-compensated conventional transmitter.

It should be noted that the ringing in the frequency response of the laser shown in FIG. 14 may also be generated artificially by proper pre-distortion of the modulating signal of the laser. It is well known to those skilled in the art that artificial ringing in the modulating electrical signal can be generated by passing a portion of S(t) through a suitable higher order electrical filter or resonator and then adding the this signal to S(t). Equivalently, one may add a prescribed combination of firs and higher order derivatives of S(t) with varying delays to the modulating signal of the laser.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for transmitting optical signals comprising:
   an optical signal source including a laser; and
   a driving circuit coupled to the optical signal source and operable to convert a data signal into a drive signal provided to the optical signal source, the drive signal comprising a combination of a modulated signal encoding the data signal and a compensation signal proportional to a time derivative of at least one of the falling edges and the rising edges of the modulated signal,
   wherein the drive signal is provided to a loss section of the laser such that optical transmission loss of the laser is modulated according to the drive signal.

2. The apparatus of claim 1, wherein the optical signal source is optically coupled to an optical spectrum reshaper, the optical spectrum reshaper converting frequency modulation of the optical signal to amplitude modulation.

3. The apparatus of claim 1, wherein the optical signal source is optically coupled to a dispersive optical medium having a path length and wherein the compensation signal has a magnitude effective to cause the optical signal to have a compensation chirp opposite in sign to dispersion experienced by the optical signal after traveling the path length of the dispersive optical medium.

4. The apparatus of claim 3, wherein the compensation signal has a magnitude effective to cause the optical signal to have an artificial transient chirp component having a magnitude sufficient to substantially compensate for between about 80 and 120 percent of dispersion experienced by the optical signal after traveling the path length of the dispersive optical medium.

5. The apparatus of claim 1, wherein the driving circuit comprises:
   a signal splitter dividing the modulated signal onto first and second signal paths, the first path including an electronic element producing an output proportional to a time derivative of an input thereof; and
   a combining circuit combining signals from the first and second signal paths.

6. The apparatus of claim 5, wherein the electronic element is a differentiator.

7. The apparatus of claim 5, wherein the electronic element is a high-pass filter.

8. The apparatus of claim 7, wherein the electronic element is a first order high-pass filter.

9. The apparatus of claim 1, wherein the compensation signal further includes a ringing component.

10. A method for transmitting optical signals comprising:
    converting a data sequence to a modulated signal encoding the data sequence;
    combining the modulated signal with a compensation signal, the compensation signal including at least a temporal portion of a weighted time derivative of the modulated signal; and
    modulating a loss section of a laser included in an optical signal source with the combined modulated signal and compensation signal to produce an optical signal.

11. The method of claim 10, further comprising transmitting the optical signal through a dispersive medium.

12. The method of claim 11, wherein the dispersive medium defines an optical path length between the optical signal source and a receiver, the compensation signal causing the optical signal to have an artificial transient chirp component having a magnitude adjusted to at least partially compensate for dispersion experienced by the optical signal after traveling the optical path length through the dispersive medium.

13. The method of claim 11, wherein the compensation signal has a magnitude causing the optical signal to have an artificial transient chirp component having a magnitude adjusted to compensate for between about 80 and 120 percent of dispersion experienced by the optical signal after traveling the optical path length through the dispersive optical medium.

14. A method for transmitting optical signals comprising:
    converting a data sequence to a modulated signal encoding the data sequence;
    combining the modulated signal with a compensation signal, the compensation signal including a weighted half-rectified derivative of the modulated signal, the weighted half-rectified derivative having a non-zero magnitude only where the weighted time derivative is negative; and
    modulating a loss section of a laser included in an optical signal source with the combined modulated signal and compensation signal to produce an optical signal.

15. A method for transmitting optical signals comprising:
    converting a data sequence to a modulated signal encoding the data sequence;
    combining the modulated signal with a compensation signal, the compensation signal including a component proportional to $H(-\dot{S}(t))$, where $\dot{S}(t)$ is a time derivative of the modulated signal and $H(\ )$ is the Heaviside step function; and
    modulating a loss section of a laser included in an optical signal source with the combined modulated signal and compensation signal to produce an optical signal.

16. The method of claim 10, wherein combining the modulated signal with the compensation signal comprises coupling the modulated signal to a differentiator and combining the modulated signal with an output of the differentiator.

17. The method of claim 10, wherein combining the modulated signal with the compensation signal comprises coupling the modulated signal to a first order high-pass filter and combining an output of the first order high-pass filter with the modulated signal.

18. The apparatus of claim 1, wherein the compensation signal includes only a time derivative of falling edges of the modulated signal.

19. The apparatus of claim 1, wherein the compensation signal includes a time derivative of both falling and rising edges of the modulated signal.

20. The method of claim 10, wherein the compensation signal includes a weighted time derivative of only falling edges of the modulated signal.

21. The method of claim 10, wherein the compensation signal includes a weighted time derivative of both falling and rising edges of the modulated signal.

* * * * *